US012349247B2

(12) United States Patent
Chou et al.

(10) Patent No.: US 12,349,247 B2
(45) Date of Patent: Jul. 1, 2025

(54) LED POWER SUPPLY EQUIPMENT WITH BI-LEVEL DIMMING

(71) Applicant: DELTA ELECTRONICS, INC., Taoyuan (TW)

(72) Inventors: Ching-Ho Chou, Taoyuan (TW); Yung-Chuan Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 144 days.

(21) Appl. No.: 18/152,446

(22) Filed: Jan. 10, 2023

(65) Prior Publication Data

US 2024/0130013 A1 Apr. 18, 2024

(30) Foreign Application Priority Data

Oct. 12, 2022 (CN) ......................... 202211247761.8
Oct. 12, 2022 (CN) ......................... 202211247783.4

(51) Int. Cl.
*H05B 45/10* (2020.01)
*H05B 45/355* (2020.01)

(52) U.S. Cl.
CPC ........... *H05B 45/10* (2020.01); *H05B 45/355* (2020.01)

(58) Field of Classification Search
CPC .......... H01J 65/048; H01J 61/56; H01J 61/28; H01J 5/54; H01J 7/20; H01J 7/22; H01J 9/247; H01J 9/323; H01J 9/34; H01J 9/395; H01J 9/40; H01J 61/523; H01J 61/20; H01J 61/24; H01J 61/72; H01J 65/042; H01J 1/52; H01J 61/025; H01J 61/35; H01J 61/44; H01J 61/46; H01J 61/52; H01J 61/545; H01J 61/547; H01J 65/044; Y02B 20/00; Y02B 10/10; Y02B 70/10; Y02B 20/30; Y02B 10/70; Y02B 20/40; H05B 41/2806; H05B 41/38; H05B 41/3921; H05B 39/048; H05B 39/08; H05B 45/10; H05B 45/385; H05B 41/3924; H05B 41/3927; H05B 39/04; H05B 39/044;

(Continued)

(56) References Cited

U.S. PATENT DOCUMENTS

2011/0193494 A1* 8/2011 Gaknoki ............. H05B 45/382 315/307
2013/0119887 A1* 5/2013 Clark ..................... H05B 45/44 315/291

(Continued)

*Primary Examiner* — Monica C King
(74) *Attorney, Agent, or Firm* — Muncy, Geissler, Olds & Lowe, P.C.

(57) ABSTRACT

A bi-level dimming LED power supply equipment adjusts the brightness of a plurality of LED lights according to whether an external detection switch is triggered turned on. The LED power supply equipment includes a plurality of LED power supplies, and the LED power supplies respectively include an input end and an output end. The input end receives an input voltage, and the output end includes a bus positive end, a bus negative end and a dimming end. The dimming end is commonly coupled to a first end of the external detection switch, and one of the bus positive end or the bus negative end is commonly coupled to a second end of the external detection switch and one end of the LED lights, and the other one of the bus positive end or the bus negative end is respectively coupled to the other ends of the LED lights.

8 Claims, 12 Drawing Sheets

(58) Field of Classification Search
CPC .. H05B 45/3725; H05B 45/38; H05B 45/382; H05B 45/355; H05B 47/105; H05B 47/18; H05B 41/24; H05B 41/382; H05B 45/3575
See application file for complete search history.

(56) References Cited

U.S. PATENT DOCUMENTS

2014/0062338 A1* 3/2014 Zulim .................... H05B 47/18 315/307
2015/0250039 A1* 9/2015 Zulim ....................... G05F 1/10 315/307

* cited by examiner

LED POWER SUPPLY EQUIPMENT WITH BI-LEVEL DIMMING

BACKGROUND

Technical Field

The present disclosure relates to an LED power supply equipment, and more particularly to an LED power supply equipment with bi-level dimming.

Description of Related Art

The statements in this section merely provide background information related to the present disclosure and do not necessarily constitute prior art.

In today's lighting technology field, LED (light-emitting diode) lighting replaces traditional fluorescent lighting, which can save more than 40% of electricity, and therefore the LED lighting has become the mainstream design of freezer lighting system. The intelligent lighting control system can further increase the energy saving benefits. Specifically, the control performance of 100%, 50%, 20%, and 0% brightness output can be performed through the passive infrared sensor (PIR motion detector) and the LED dimming controller. Please refer to FIG. 1A, which shows a block circuit diagram of a conventional LED power supply system 100A, and further an LED dimming controller 100B having four inputs and four outputs. Each input is connected to the 24-volt output of 100-watt LED power supply 10-1A to 10-4A, and the LED dimming controller 100B generates 100%, 50%, 20%, or 0% output to drive LED lamps 2-1 to 2-4. A single LED lamp is about 20 to 25 watts (that is, a single LED lamp 2-1 to 2-4 is about 80 to 100 watts), and large-area lighting can use four LED light lamps in parallel. Each LED lamp 2-1 to 2-4 has a built-in current regulator, which can provide constant output brightness. A sensor 3' can monitor the personnel approaching or leaving the display product area, and transmit the monitoring signal to the LED dimming controller 100B through the RJ-11 signal wire to perform LED output brightness control.

On the other hand, as shown in FIG. 1B, the intelligent lighting control system can be significantly simplified through the standard 0 to 10-volt LED power supply system 100A. In comparison with FIG. 1A, the expensive LED dimming controller 100B is eliminated, and the sensor 3' is changed to the conventional input voltage power supply, and an internal relay is used to perform the control purpose. In particular, the standard 0 to 10-volt dimming control interface is a current source design, and therefore it can be cooperated with a resistive dimmer. In other words, a resistor may be connected in series with the 0 to 10-volt dimming control interface to realize the two-stage dimming function. Besides that each output of the LED power supply system 100A is connected in series with a resistor R, they are connected in parallel through the relay of the sensor 3'. However, the output circuit of this design manner is complicated, and an external resistor is required, resulting in the disadvantages of high circuit cost and complicated assembly.

SUMMARY

In order to solve the above-mentioned problems, the present disclosure provides an LED power supply equipment with bi-level dimming. The LED power supply equipment with bi-level dimming receives an input voltage to supply power to a plurality of LED lamps, and adjusts the brightness of the LED lamps according to whether an external detection switch is triggered to be turned on. The LED power supply equipment includes a plurality of LED power supplies. Each LED power supply includes an input end and an output end. The input end receives the input voltage. The output end includes a bus positive end, a bus negative end, and a dimming end. The dimming ends of the LED power supplies are commonly coupled to a first end of the external detection switch, the bus positive ends of the LED power supplies are commonly coupled to a second end of the external detection switch and first input ends of the LED lamps, and the bus negative ends of the LED power supplies are respectively coupled to second input ends of the LED lamps.

In order to solve the above-mentioned problems, the present disclosure provides an LED power supply equipment with bi-level dimming. The LED power supply equipment with bi-level dimming receives an input voltage to supply power to a plurality of LED lamps, and adjusts the brightness of the LED lamps according to whether an external detection switch is triggered to be turned on. The LED power supply equipment includes a plurality of LED power supplies. Each LED power supply includes an input end and an output end. The input end receives the input voltage. The output end includes a bus positive end, a bus negative end, and a dimming end. The dimming ends of the LED power supplies are commonly coupled to a first end of the external detection switch, the bus negative ends of the LED power supplies are commonly coupled to a second end of the external detection switch and second input ends of the LED lamps, and the bus positive ends of the LED power supplies are respectively coupled to first input ends of the LED lamps.

The main purpose and effect of the present disclosure are that, since the LED power supply equipment of the present disclosure only uses a single dimming end to couple one end of the external detection switch, the other end of the external detection switch is simplified to be coupled to the bus positive end or the bus negative end of the LED power supply equipment, the four-wire output of the conventional LED power supply system may be simplified to a three-wire output, and there is no need to connect a resistor in series as in the prior art, thereby simplifying the complexity of the output circuit and reducing the circuit cost.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
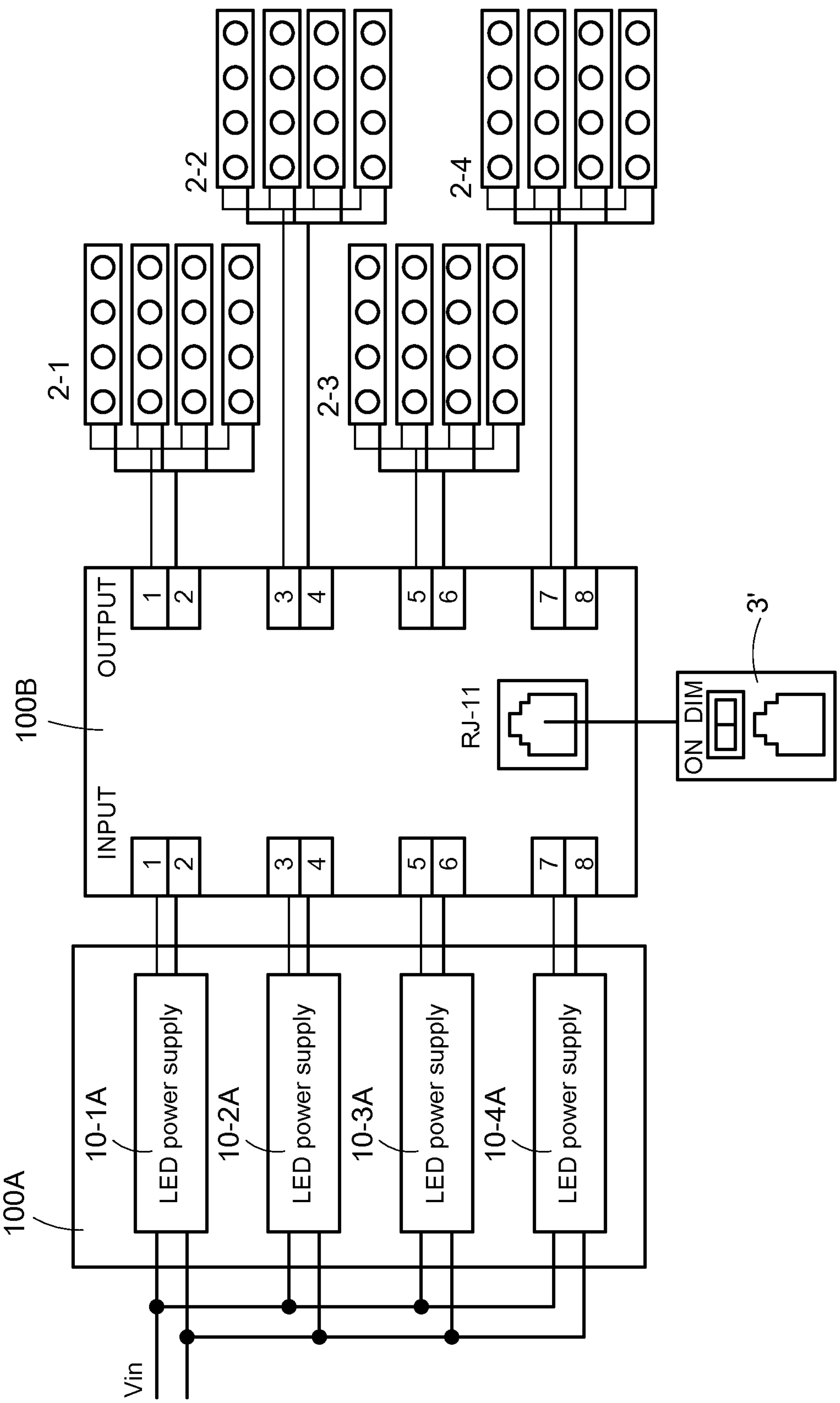
FIG.1A (Related Art)
FIG. 1A is a block circuit diagram of a conventional LED power supply system.

Reference will now be made to the drawing figures to describe the present disclosure in detail. It will be understood that the drawing figures and exemplified embodiments of present disclosure are not limited to the details thereof.

Figure 1B:
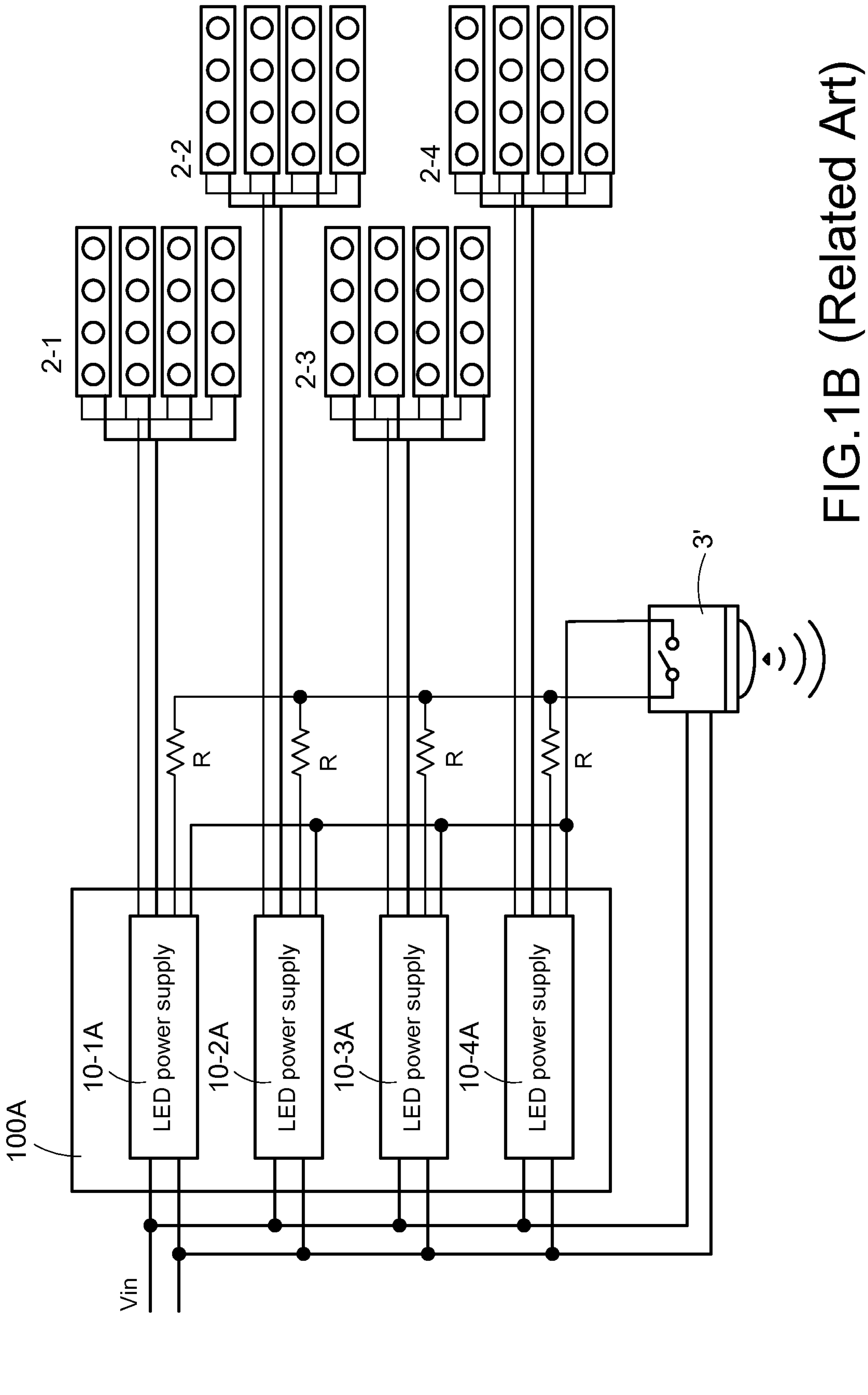
FIG.1B (Related Art)
FIG. 1B is a block circuit diagram of another conventional LED power supply system.
Figure 2:
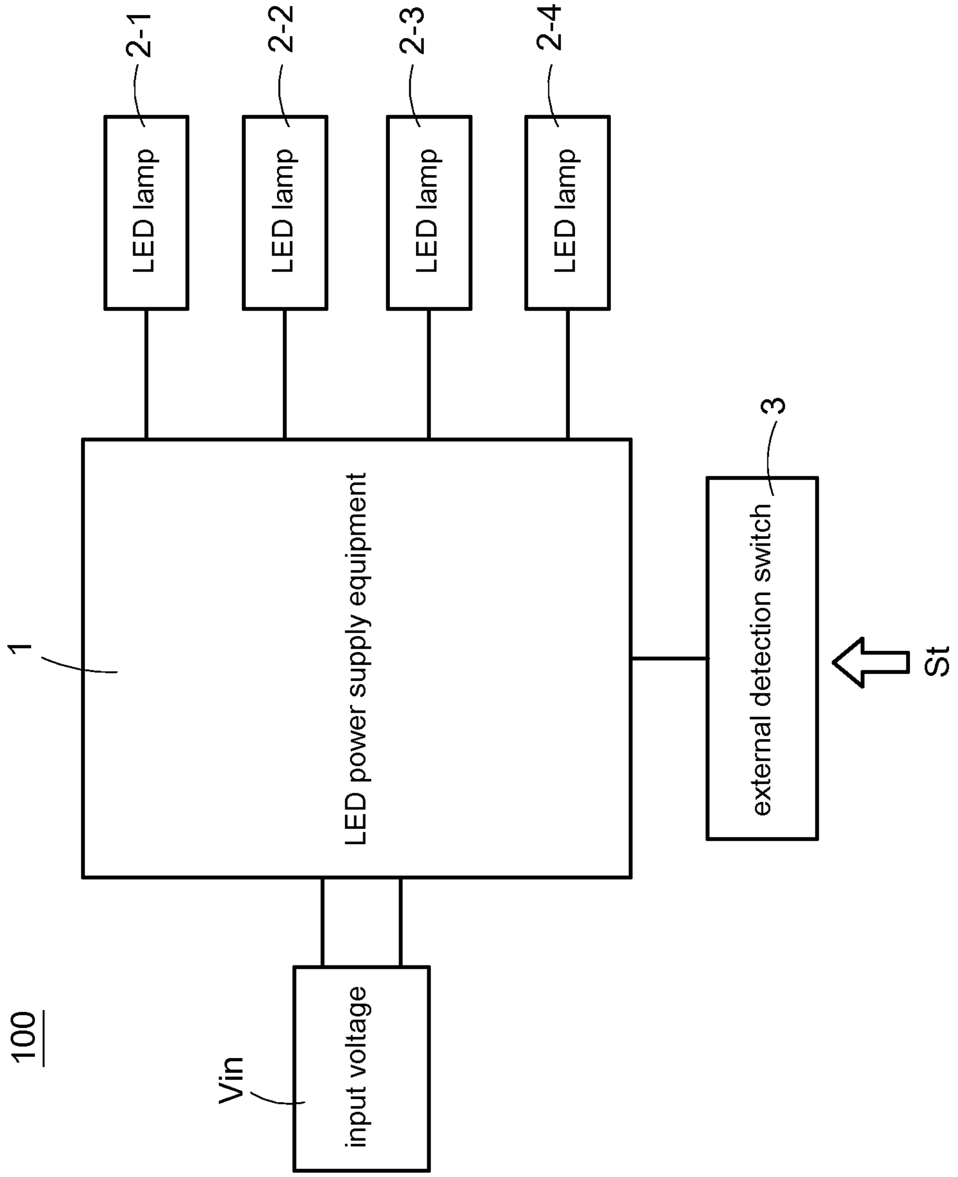
FIG. 2 is a block circuit diagram of an LED (light-emitting diode) power supply system with bi-level dimming according to the present disclosure.

Please refer to FIG. 2, which shows block circuit diagram of an LED (light-emitting diode) power supply system with bi-level dimming according to the present disclosure, and also refer to FIG. 1A and FIG. 1B. The LED power supply system 100 includes an LED power supply equipment 1, a plurality of LED lamps 2-1 to 2-4, and an external detection switch 3 (i.e., a PD sensor). The LED power supply equipment 1 receives an input voltage Vin to supply power to the LED lamps 2-1 to 2-4, and adjusts the brightness of the LED lamps 2-1 to 2-4 according to whether an external detection switch 3 is triggered to be turned on. In particular, the external detection switch 3 may be, for example, but not limited to, a tactile external detection switch, an inductive external detection switch, etc. The external detection switch 3 is turned on or turned off based on the trigger signal St provided by the presence or absence of a person or by the trigger of a person. For example, but not limited to, the external detection switch 3 may preferably be achieved by using a photo detection sensor (PD sensor). When the external detection switch 3 senses a person, the LED power supply system 100 triggers and turns off the external detection switch 3 according to the trigger signal St so as to control the LED lamps 2-1 to 2-4 to provide the first brightness (i.e., full (100%) brightness). On the contrary, the LED power supply system 100 is triggered and turned on according to the trigger signal St so as to control the LED lamps 2-1 to 2-4 to provide a second brightness (for example, but not limited to, 30% brightness).

Figure 3A:
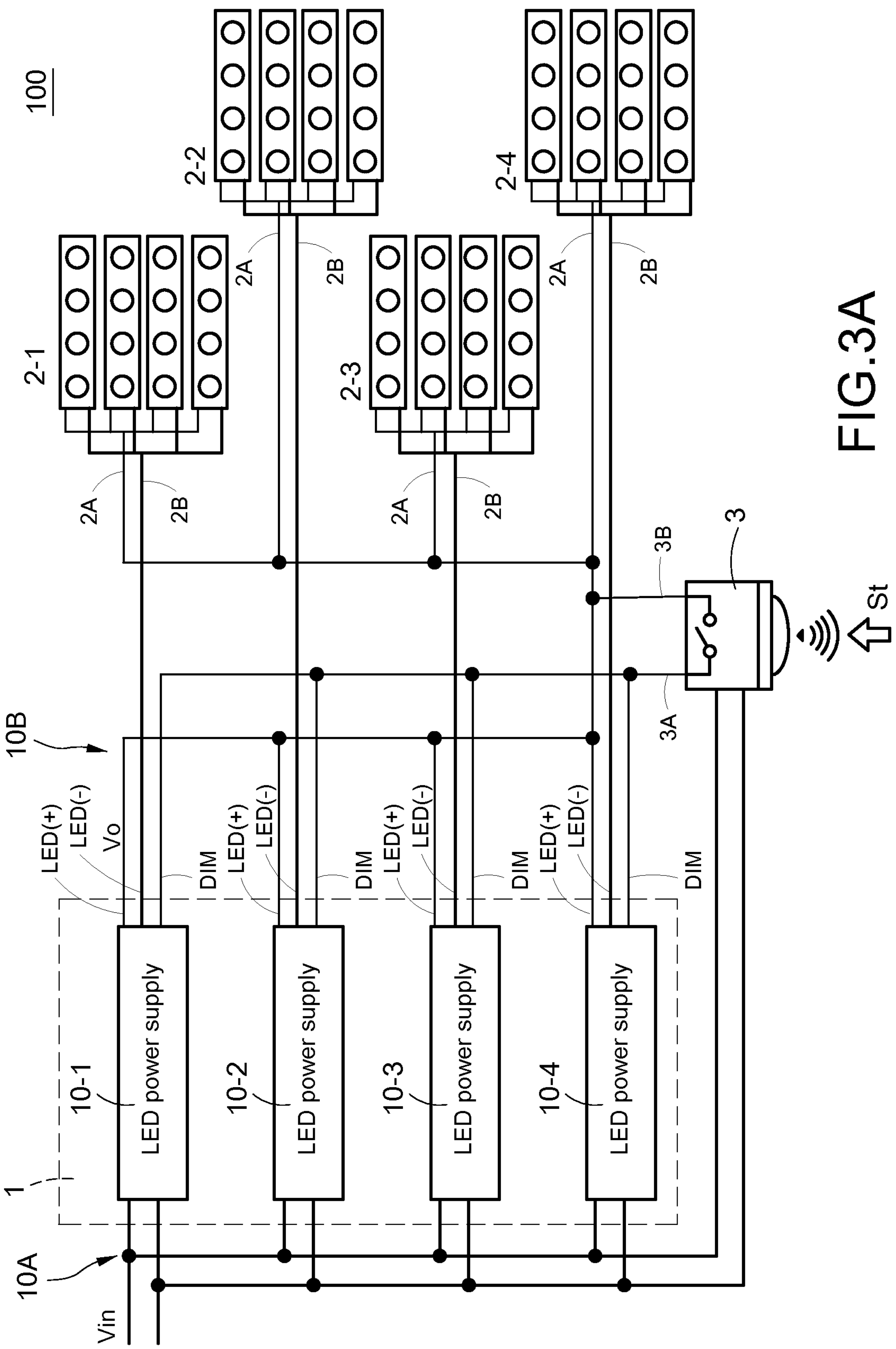
FIG. 3A is a block circuit diagram of the LED power supply system with bi-level dimming according to a first embodiment of the present disclosure.

Please refer to FIG. 3A, which shows a block circuit diagram of the LED power supply system with bi-level dimming according to a first embodiment of the present disclosure, and also refer to FIG. 2. The LED power supply equipment 1 includes a plurality of LED power supplies 10-1 to 10-4, and each power supply 10-1 to 10-4 includes an input end 10A and an output end 10B. The input end 10A of the power supply 10-1 to 10-4 receives the input voltage Vin, and the output end 10B of the power supply 10-1 to 10-4 includes a bus positive end LED(+), a bus negative end LED(−), and a dimming end DIM. The dimming ends DIM of the LED power supplies 10-1 to 10-4 are commonly coupled to a first end 3A of the external detection switch 3. The bus positive ends LED(+) of the LED power supplies 10-1 to 10-4 are commonly coupled to a second end 3B of the external detection switch 3 and first input ends 2A of the LED lamps 2-1 to 2-4. The bus negative ends LED(−) of the LED power supplies 10-1 to 10-4 are respectively coupled to second input ends 2B of the LED lamps 2-1 to 2-4. When the external detection switch 3 is triggered to be turned on, the dimming ends DIM of the LED power supplies 10-1 to 10-4 are coupled to the bus positive ends LED(+) of the LED power supplies 10-1 to 10-4 through the external detection switch 3.

In one preferred embodiment, the number of the LED power supplies 10-1 to 10-4 is the same as the number of the LED lamps 2-1 to 2-4. Therefore, the LED power supplies 10-1 to 10-4 have enough power supply capacity to meet the requirements of the LED lamps 2-1 to 2-4. In addition, the external detection switch 3 can be powered by external power, or powered by the input voltage Vin so that the external detection switch 3 can be triggered to be turned on or turned off according to the trigger signal St.

Figure 3B:
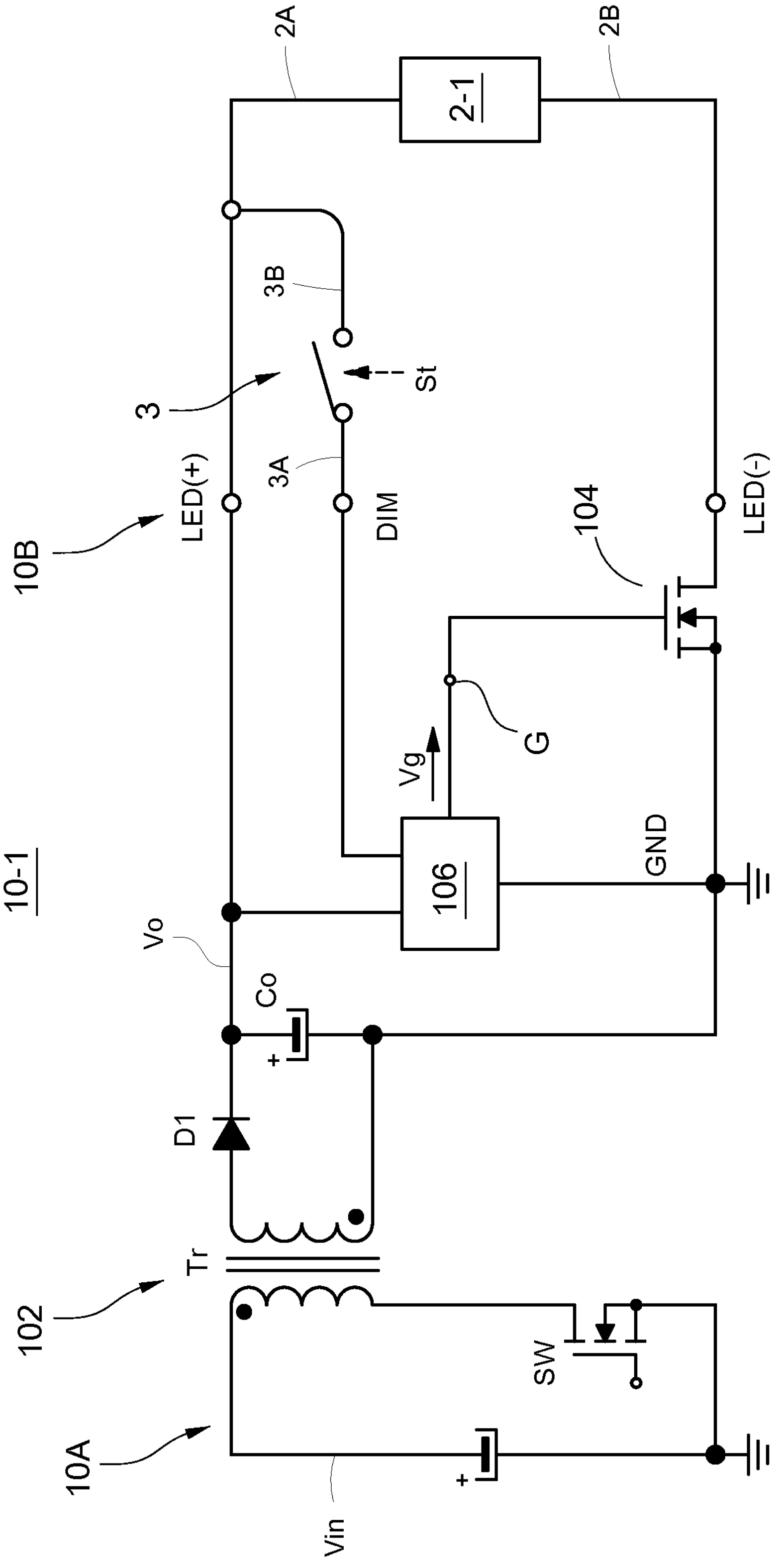
FIG. 3B is a block circuit diagram of an LED power supply with bi-level dimming according to a first embodiment of the present disclosure.
Figure 3C:
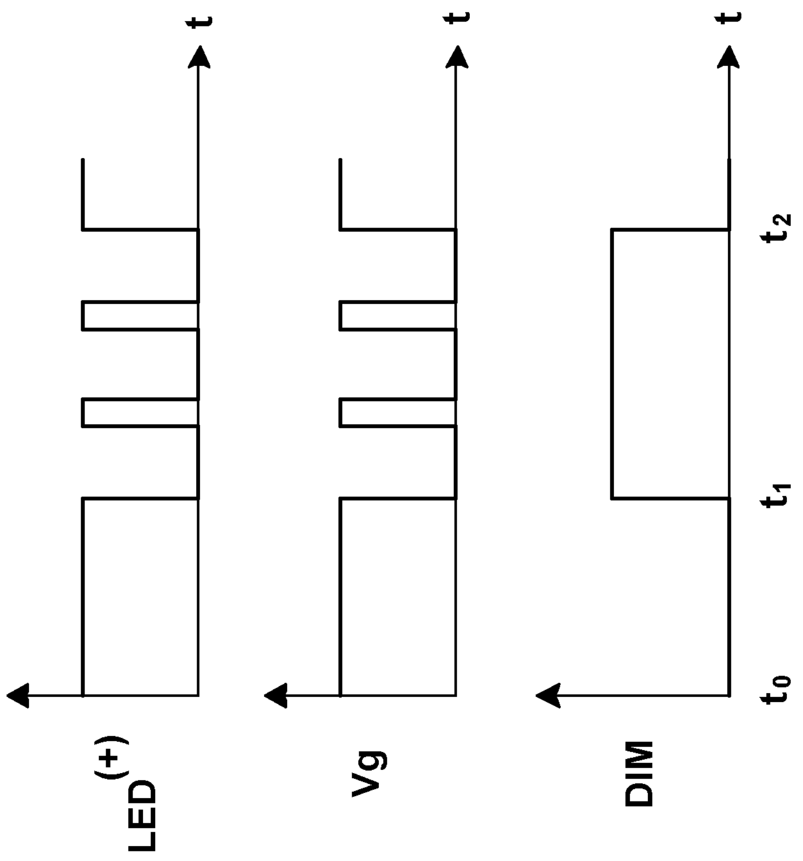
FIG. 3C is a schematic waveform of the LED power supply with bi-level dimming according to a first embodiment of the present disclosure.

Please refer to FIG. 3B, which shows a block circuit diagram of an LED power supply with bi-level dimming according to a first embodiment of the present disclosure; please refer to FIG. 3C, which shows a schematic waveform of the LED power supply with bi-level dimming according to a first embodiment of the present disclosure, and also refer to FIG. 2 and FIG. 3A. Each LED power supply 10-1 to 10-4 includes a conversion circuit 102, a switch 104, and an oscillation circuit 106. The conversion circuit 102 converts the input voltage Vin into an output voltage Vo. In one embodiment, the conversion circuit 102 is, for example, but not limited to, an isolated DC/DC converter, such as a flyback converter. An input side of the conversion circuit 102 is connected to a bulk capacitor, and the bulk capacitor is coupled to a front-end PFC circuit. Tr is an isolated transformer of the flyback converter. Sw is a power switching switch of the flyback converter, and a MOSFET is generally used. D1 is an output rectification diode of the flyback converter, and a Schottky diode is generally used at 12-volt or 24-volt DC output specification. Co is an output capacitor for providing a stable DC voltage after filtering. The conversion circuit 102 is coupled to the second end 3B of the external detection switch 3 and the first input ends 2A of the LED lamps 2-1 to 2-4 through the bus positive ends LED(+), and is coupled to the second input end 2B of one of the LED lamps 2-1 to 2-4 through the bus negative ends LED(−) so that the LED power supplies 10-1 to 10-4 and the LED lamps 2-1 to 2-4 respectively form closed current paths. Therefore, the LED power supplies 10-1 to 10-4 provide the output voltage Vo to supply power to the LED lamps 2-1 to 2-4 to control the first brightness of the LED lamps 2-1 to 2-4.

The switch 104 may be, for example, but not limited to, a transistor switch, and is coupled to the bus negative end LED(−). The oscillation circuit 106 includes a dimming end DIM and a control end G. The control end G is coupled to the switch 104, and the dimming end DIM is coupled to the first end 3A of the external detection switch 3. Also refer to FIG. 3C, the oscillation circuit 106 is coupled to the bus positive end LED(+) when the external detection switch 3 is triggered to be turned on to provide a dimming signal Vg with a fixed frequency and a duty cycle to the switch 104 through the control end G. The switch 104 correspondingly adjusts the output voltage Vo according to the dimming signal Vg to control the LED lamp 2-1 to 2-4 to provide a second brightness. In one embodiment, the oscillation circuit 106 may be an astable multivibrator oscillator circuit, an LM555 timing circuit, an oscillator circuit composed of circuit components, or a control unit composed of a software program. In addition, the fixed frequency is mainly for stabilizing the brightness of the LED lamps 2-1 to 2-4 and avoiding the situation where the brightness is flickering. The frequency is preferably greater than 1 KHz and much lower than the frequency of the conversion circuit (for example, but not limited to, 65 KHz), thereby avoiding the phenomenon that the frequency is too low, the human eye feels the flickering of the LED lights 200. In particular, the frequency is best with a low frequency oscillation of 1 KHz.

Take the bus negative end LED(−) of the LED power supply 10-1 coupled to the second input end 2B of the LED lamp 2-1 as an ample. When the external detection switch 3 is triggered to be turned off by the trigger signal St, the voltage received by the dimming end DIM is shown during time t0 to time t1. The oscillation circuit 106 controls the switch 104 to be normally turned on by the dimming signal Vg so as to control the conversion circuit 102 to provide the DC output voltage Vo, thereby controlling the LED lamp 2-1 to provide the first brightness (for example, full (100%) brightness). When the external detection switch 3 is triggered to be turned on by the trigger signal St, the voltage received by the dimming end DIM is shown during time t1 to time t2. The oscillation circuit 106 controls the switch 104 to be repeatedly turned on and turned off through the dimming signal Vg with the fixed frequency and the duty cycle so as to control the conversion circuit 102 to provide the DC output voltage Vo with the fixed frequency and the duty cycle, thereby controlling the LED lamp 2-1 to provide the second brightness (for example, 30% brightness). In one embodiment, according to the LED light source and the manufacturer's product specifications, the bi-level dimming output of 100% and 20%, or that of 100% and 10% can also be further achieved.

Figure 4:
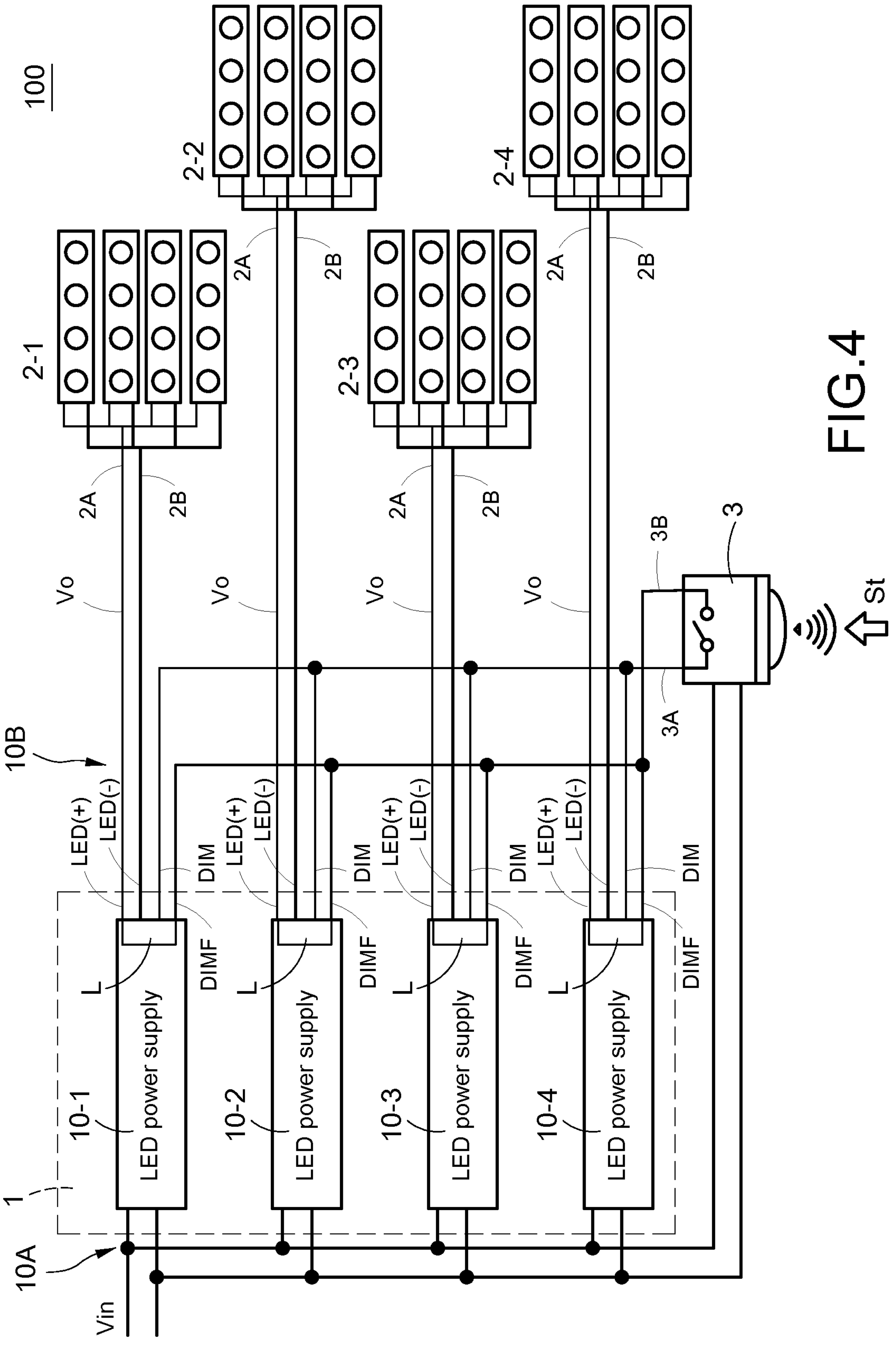
FIG. 4 is a block circuit diagram of the LED power supply system with bi-level dimming according to a second embodiment of the present disclosure.

Please refer to FIG. 4, which shows a block circuit diagram of the LED power supply system with bi-level dimming according to a second embodiment of the present disclosure, and also refer to FIG. 2 to FIG. 3C. The difference between the LED power supply system 100 shown in FIG. 4 and that shown in FIG. 3A is that the output end 10B of each LED power supply 10-1 to 10-4 further includes a dummy dimming end DIMF. The dummy dimming end DIMF is coupled to the bus positive end LED(+) through a short-circuit wire L so that the LED power supplies 10-1 to 10-4 are coupled to each other through the dummy dimming ends DIMF, and therefore the bus positive ends LED(+) of the LED power supplies 10-1 to 10-4 are commonly coupled. Specifically, different from the four-wire output LED power supplies used in the prior art as shown in FIG. 1A and FIG. 1B, the LED power supply system 100 of the present disclosure uses three-wire output LED power supplies 10-1 to 10-4 to control the brightness of the LED lamps 2-1 to 2-4, that is, the LED power supplies 10-1 to 10-4 only use the bus positive ends LED(+), the bus negative ends LED(−), and the dimming ends DIM to control the brightness of the LED lamps 2-1 to 2-4.

However, in some specific occasions, the manufacturer may not replace the entire LED power supply system 100, but only replace the LED power supply equipment 1. In this condition, the connectors of connecting the LED power supplies 10-1 to 10-4 and the LED lamps 2-1 to 2-4 may still belong to the structure applied to the four-wire (four-pin) output. In order to make the three-wire output LED power supplies 10-1 to 10-4 of the present disclosure compatible with the four-wire output structure, a set of dummy dimming ends DIMF is added to the output ends 10B through the short-circuit wire L, and the dummy dimming ends DIMF are coupled to the bus positive ends LED(+) through the short-circuit wires L. In one embodiment, FIG. 3B and FIG. 3C are applicable to the LED power supply system 100 shown in FIG. 3A and FIG. 4. In addition, in one embodiment, the circuit structure and control method not mentioned in FIG. 4 are the same as those in FIG. 3A, and the circuit structure and control method of FIG. 3B and FIG. 3C may be compatible with the LED power supply system 100 of FIG. 4, and the detail description is omitted here for conciseness.

Figure 5A:
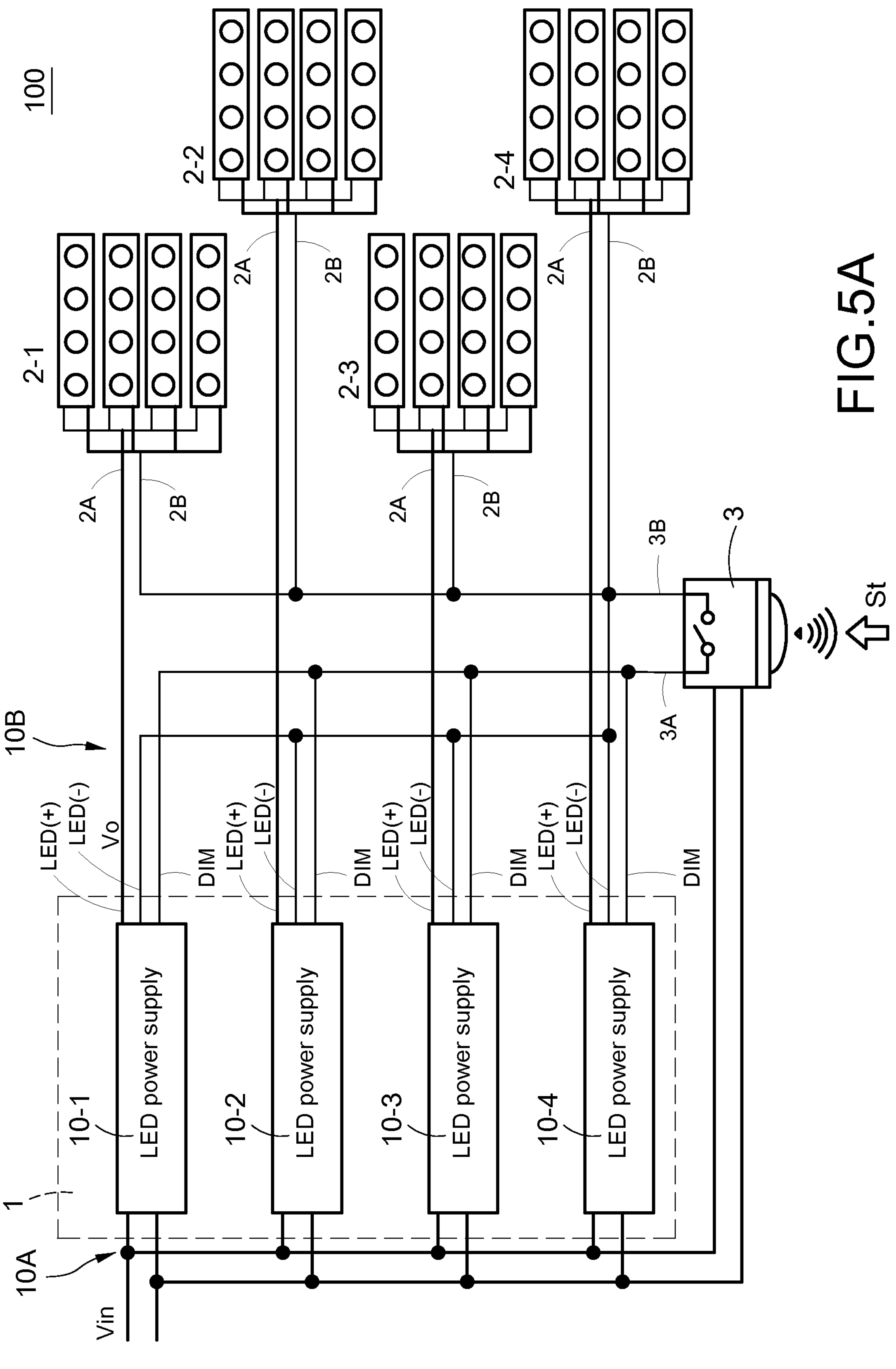
FIG. 5A is a block circuit diagram of the LED power supply system with bi-level dimming according to a third embodiment of the present disclosure.

Please refer to FIG. 5A, which shows a block circuit diagram of the LED power supply system with bi-level dimming according to a third embodiment of the present disclosure, and also refer to FIG. 2 to FIG. 4. The difference between the LED power supply system 100 shown in FIG. 5A and that shown in FIG. 3A is that a contact where the LED power supplies 10-1 to 10-4 are commonly coupled is opposite to the bus positive ends LED(+) of FIG. 3A. Specifically, in FIG. 5A, the dimming ends DIM of the LED power supplies 10-1 to 10-4 are commonly coupled to the first end 3A of the external detection switch 3. The bus negative ends LED(−) of the LED power supplies 10-1 to 10-4 are commonly coupled to the second end 3B of the external detection switch 3 and second input ends 2B of the LED lamps 2-1 to 2-4. The bus positive ends LED(+) of the LED power supplies 10-1 to 10-4 are respectively coupled to first input ends 2A of the LED lamps 2-1 to 2-4. When the external detection switch 3 is triggered to be turned on, the dimming ends DIM of the LED power supplies 10-1 to 10-4 are coupled to the bus negative ends LED(−) of the LED power supplies 10-1 to 10-4 through the external detection switch 3.

Figure 5B:
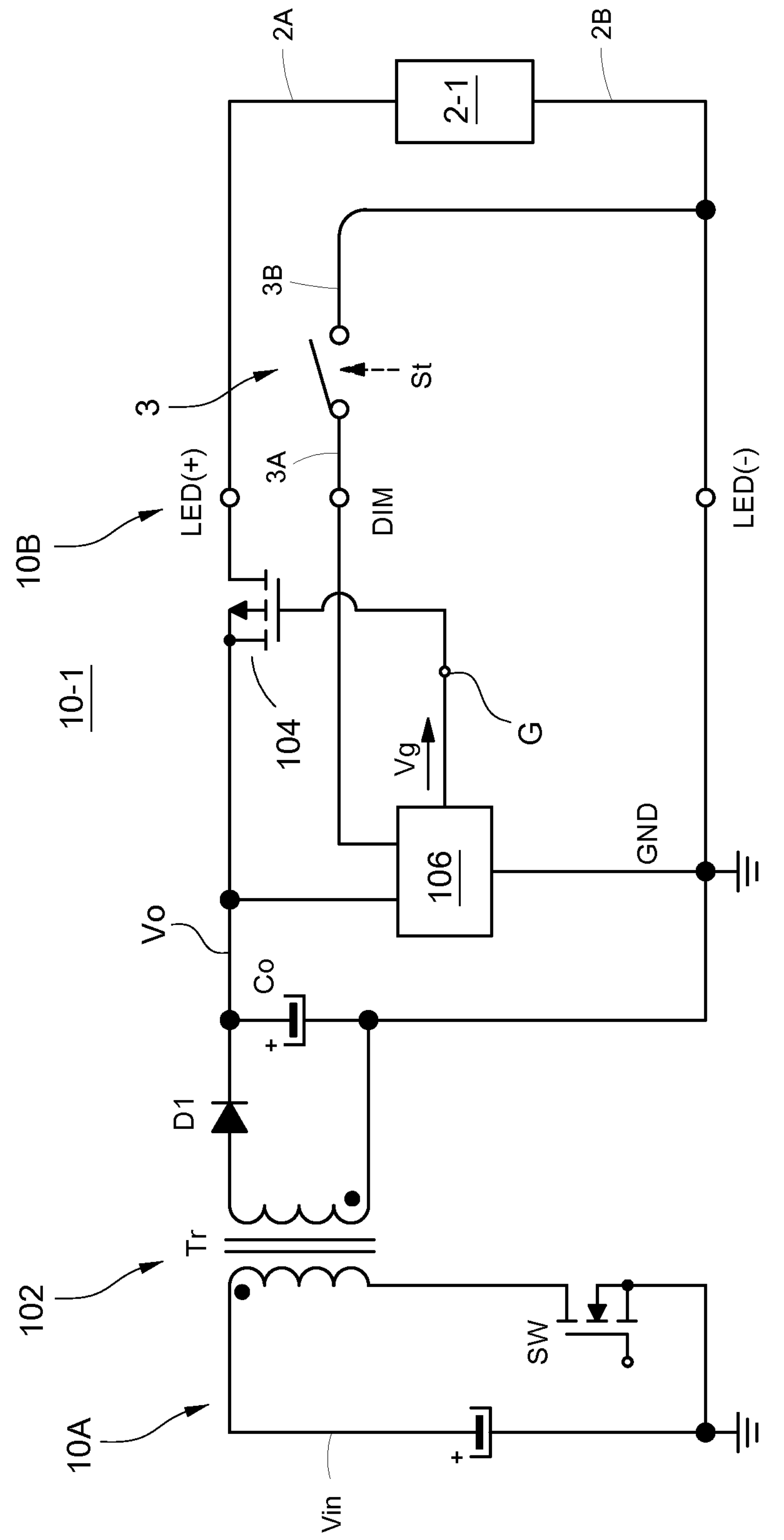
FIG. 5B is a block circuit diagram of the LED power supply with bi-level dimming according to a third embodiment of the present disclosure.
Figure 5C:
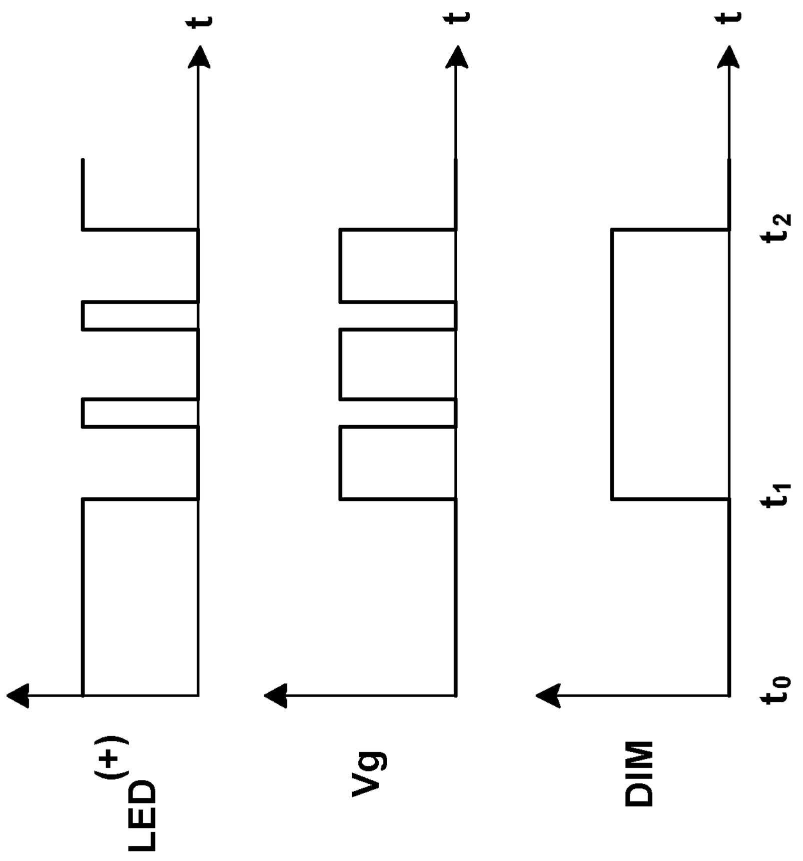
FIG. 5C is a schematic waveform of the LED power supply with bi-level dimming according to a third embodiment of the present disclosure.

Please refer to FIG. 5B, which shows a block circuit diagram of the LED power supply with bi-level dimming according to a third embodiment of the present disclosure; please refer to FIG. 5C, which shows a schematic waveform of the LED power supply with bi-level dimming according to a third embodiment of the present disclosure, and also refer to FIG. 2 and FIG. 5A. The difference between the LED power supplies 10-1 to 10-4 shown in FIG. 5B and those shown in FIG. 3B is that the conversion circuit 102 is coupled to the first input end 2A of one of the LED lamps 2-1 to 2-4 through the bus positive ends LED(+) so that the LED power supplies 10-1 to 10-4 and the LED lamps 2-1 to 2-4 respectively form closed current paths. Therefore, the LED power supplies 10-1 to 10-4 provide the output voltage Vo to supply power to the LED lamps 2-1 to 2-4 to control the first brightness of the LED lamps 2-1 to 2-4.

Also refer to FIG. 5C, the oscillation circuit 106 is coupled to the bus negative end LED(−) when the external detection switch 3 is triggered to be turned on to provide a dimming signal Vg with a fixed frequency and a duty cycle to the switch 104 through the control end G. The switch 104 correspondingly adjusts the output voltage Vo according to the dimming signal Vg to control the LED lamp 2-1 to 2-4 to provide a second brightness. Take the bus positive ends LED(+) of the LED power supply 10-1 coupled to the first input end 2A of the LED lamp 2-1 as an ample. When the external detection switch 3 is triggered to be turned off by the trigger signal St, the dimming end DIM is floating during time t0 to time t1. Therefore, a low-level signal indicates that the oscillation circuit 106 is not activated. The oscillation circuit 106 controls the switch 104 to be normally turned on by the dimming signal Vg so as to control the conversion circuit 102 to provide the DC output voltage Vo, thereby controlling the LED lamp 2-1 to provide the first brightness (for example, full (100%) brightness). When the external detection switch 3 is triggered to be turned on by the trigger signal St, the dimming end DIM is grounded (i.e., coupled to the bus negative end LED(−)) during time t1 to time t2. Therefore, a high-level signal indicates that the oscillation circuit 106 is activated. The oscillation circuit 106 controls the switch 104 to be repeatedly turned on and turned off through the dimming signal Vg with the fixed frequency and the duty cycle so as to control the conversion circuit 102 to provide the DC output voltage Vo with the fixed frequency and the duty cycle, thereby controlling the LED lamp 2-1 to provide the second brightness (for example, 30% brightness).

Figure 6:
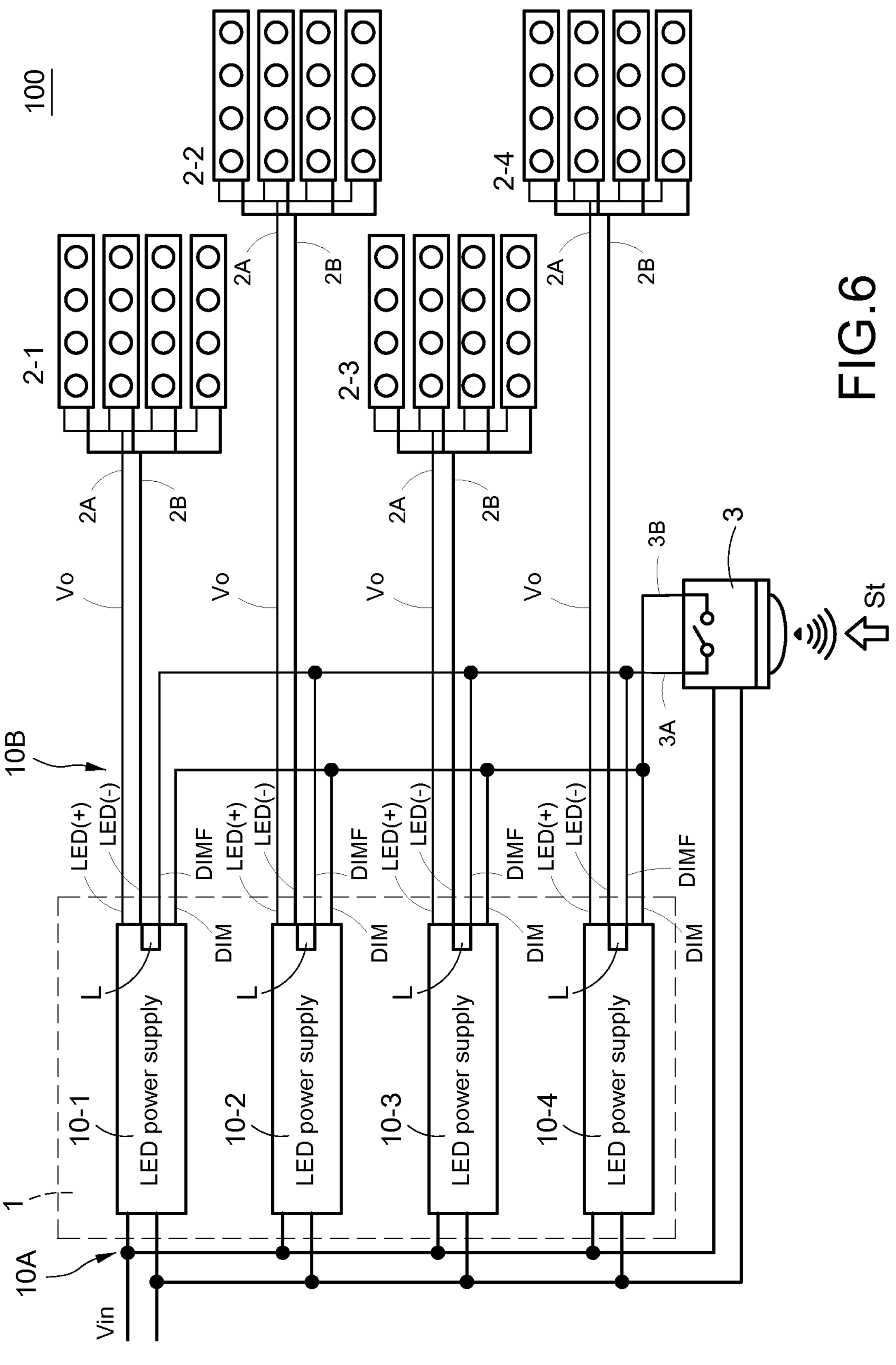
FIG. 6 is a block circuit diagram of the LED power supply system with bi-level dimming according to a fourth embodiment of the present disclosure.

Please refer to FIG. 6, which shows a block circuit diagram of the LED power supply system with bi-level dimming according to a fourth embodiment of the present disclosure, and also refer to FIG. 2 to FIG. 5C. The difference between the LED power supply system 100 shown in FIG. 6 and that shown in FIG. 4 is that the dummy dimming end DIMF is coupled to the bus negative ends LED(−) through a short-circuit wire L so that the LED power supplies 10-1 to 10-4 are coupled to each other through the dummy dimming ends DIMF, and therefore the bus negative ends LED(−) of the LED power supplies 10-1 to 10-4 are commonly coupled. Accordingly, the three-wire output LED power supplies 10-1 to 10-4 used in the present disclosure is compatible with the four-wire output structure. In one embodiment, FIG. 5B and FIG. 5C are applicable to the LED power supply system 100 shown in FIG. 5A and FIG. 6. In addition, in one embodiment, the circuit structure and control method not mentioned in FIG. 6 are the same as those in FIG. 5A, and the circuit structure and control method of FIG. 5B and FIG. 5C may be compatible with the LED power supply system 100 of FIG. 6, and the detail description is omitted here for conciseness.

Figure 7:
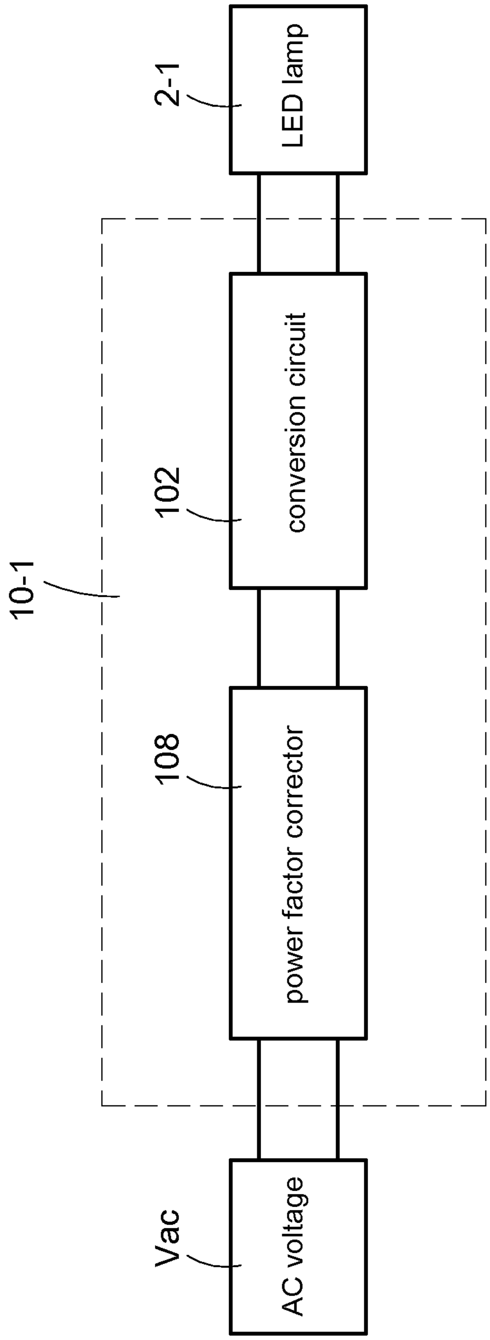
FIG. 7 is a block circuit diagram of the LED power supply with bi-level dimming according to a third embodiment of the present disclosure.

Please refer to FIG. 7, which shows a block circuit diagram of the LED power supply with bi-level dimming according to a third embodiment of the present disclosure, and also refer to FIG. 2 to FIG. 6. The difference between the LED power supply system 100 shown in FIG. 7 and that shown in FIG. 4 is that each LED power supply 10-1 to 10-4 further includes a power factor corrector 108. The power factor corrector 108 is coupled to the conversion circuit 102, and receives the AC voltage Vac, converts the AC voltage Vac into the input voltage Vin, and provides the input voltage Vin to supply power to the conversion circuit 102. Moreover, when the LED power supply system 100 is a system for receiving a DC voltage, the LED power supply system 100 receives a DC input voltage Vin. Conversely, when the LED power supply system 100 is a system for receiving AC voltage, the LED power supply system 100 receives the AC voltage Vac, and the AC voltage Vac is converted into the DC input voltage Vin by the power factor corrector 108. Therefore, the above-mentioned embodiments of FIG. 3A to FIG. 6 may selectively use the power factor corrector 108 to perform power conversion based on types of voltage that the LED power supply system 100 can receive.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An LED power supply equipment with bi-level dimming, configured to receive an input voltage to supply power to a plurality of LED lamps, and adjust the brightness of the LED lamps according to whether an external detection switch is triggered to be turned on, the LED power supply equipment comprising:

a plurality of LED power supplies, each LED power supply comprising an input end and an output end; the input end configured to receive the input voltage, and the output end comprising a bus positive end, a bus negative end, and a dimming end, wherein each LED supply comprises:

a conversion circuit, configured to convert the input voltage into an output voltage, and the conversion circuit coupled to the second end and the first input end through the bus positive end, and coupled to the second input end of one of the LED lamps to provide the output voltage to supply power to the LED lamp and control the LED lamp to provide a first brightness, a switch, coupled to the bus negative end, an oscillation circuit, comprising the dimming end and a control end; the control end coupled to the switch, and the dimming end coupled to the first end, and a power factor corrector, coupled to the conversion circuit, and configured to receive an AC voltage and convert the AC voltage into the input voltage, wherein the dimming end of each of the LED power supplies is connected to a first end of the external detection switch, the bus positive end of each of the LED power supplies is connected to a second end of the external detection switch and a first input end of a respective one of the LED lamps, and the bus negative ends of the LED power supplies are respectively coupled to second input ends of the LED lamps, and wherein the oscillation circuit is coupled to the bus positive end when the external detection switch is triggered to be turned on to provide a dimming signal with a fixed frequency and a duty cycle to the switch through the control end; the switch correspondingly adjusts the output voltage according to the dimming signal to control the LED lamp to provide a second brightness.

2. The LED power supply equipment with bi-level dimming as claimed in claim 1, wherein the oscillation circuit is an astable multivibrator or an LM555 timing circuit, and the oscillation circuit is configured to provide the dimming signal with the fixed frequency and the duty cycle when the external detection switch is triggered to be turned on.

3. The LED power supply equipment with bi-level dimming as claimed in claim 1, wherein the output end of the LED power supply further comprises:

a dummy dimming end, coupled to the bus positive end through a short-circuit wire, wherein the LED power supplies are coupled to each other through the dummy dimming ends so that the bus positive ends of the LED power supplies are commonly coupled.

4. The LED power supply equipment with bi-level dimming as claimed in claim 1, wherein the number of the LED power supplies is the same as the number of the LED lamps.

5. An LED power supply equipment with bi-level dimming, configured to receive an input voltage to supply power to a plurality of LED lamps, and adjust the brightness of the LED lamps according to whether an external detection switch is triggered to be turned on, the LED power supply equipment comprising:

a plurality of LED power supplies, each LED power supply comprising an input end and an output end; the input end configured to receive the input voltage, and the output end comprising a bus positive end, a bus negative end, and a dimming end, wherein each LED supply comprises:

a conversion circuit, configured to convert the input voltage into an output voltage, and the conversion circuit coupled to the first input end of one of the LED lamps through the bus positive end, and coupled to the second end and the second input end through the bus negative end to provide the output voltage to supply power to the LED lamp and control the LED lamp to provide a first brightness, a switch, coupled to the bus positive end, an oscillation circuit, comprising the dimming end and a control end; the control end coupled to the switch, and the dimming end coupled to the first end, and a power factor corrector, coupled to the conversion circuit, and configured to receive an AC voltage and convert the AC voltage into the input voltage, wherein the dimming end of each of the LED power supplies is connected to a first end of the external detection switch, the bus negative end of each of the LED power supplies is connected to a second end of the external detection switch and a second input end of a respective one of the LED lamps, and the bus positive ends of the LED power supplies are respectively coupled to first input ends of the LED lamps, and wherein the oscillation circuit is coupled to the bus negative end when the external detection switch is triggered to be turned on to provide a dimming signal with a fixed frequency and a duty cycle to the switch through the control end; the switch correspondingly adjusts the output voltage according to the dimming signal to control the LED lamp to provide a second brightness.

6. The LED power supply equipment with bi-level dimming as claimed in claim 5, wherein the oscillation circuit is an astable multivibrator or an LM555 timing circuit, and the oscillation circuit is configured to provide the dimming signal with the fixed frequency and the duty cycle when the external detection switch is triggered to be turned on.

7. The LED power supply equipment with bi-level dimming as claimed in claim 5, wherein the output end of the LED power supply further comprises:

a dummy dimming end, coupled to the bus positive end through a short-circuit wire, wherein the LED power supplies are coupled to each other through the dummy dimming ends so that the bus negative ends of the LED power supplies are commonly coupled.

8. The LED power supply equipment with bi-level dimming as claimed in claim 5, wherein the number of the LED power supplies is the same as the number of the LED lamps.

* * * * *